(12) United States Patent
Webber

(10) Patent No.: US 6,991,253 B2
(45) Date of Patent: Jan. 31, 2006

(54) AIR BAG ASSEMBLY HAVING CONTROLLED CUSHION DEPLOYMENT

(75) Inventor: James Lloyd Webber, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 177 days.

(21) Appl. No.: 10/411,857

(22) Filed: Apr. 11, 2003

(65) Prior Publication Data

US 2004/0201205 A1  Oct. 14, 2004

(51) Int. Cl.
*B60R 21/20* (2006.01)

(52) U.S. Cl. .................................... 280/728.3; 280/732
(58) Field of Classification Search ............ 280/728.3, 280/732, 743.1, 743.2
See application file for complete search history.

(56) References Cited

U.S. PATENT DOCUMENTS

| | | | |
|---|---|---|---|
| 4,332,398 A * | 6/1982 | Smith | 280/732 |
| 5,125,682 A | 6/1992 | Hensler et al. | 280/730 |
| 5,253,892 A | 10/1993 | Satoh | 280/731 |
| 5,292,151 A * | 3/1994 | Parker | 280/728.3 |
| 5,308,113 A | 5/1994 | Moriset | 280/743 |
| 5,431,435 A * | 7/1995 | Wilson | 280/728.3 |
| 5,489,119 A | 2/1996 | Prescaro et al. | 280/743.2 |
| 5,630,614 A * | 5/1997 | Conlee et al. | 280/730.1 |
| 5,636,861 A * | 6/1997 | Orsulak et al. | 280/730.1 |
| 5,762,367 A | 6/1998 | Wolanin | 280/736 |
| 5,806,883 A | 9/1998 | Cuevas | 280/731 |
| 5,826,901 A | 10/1998 | Adomeit | 280/728.2 |
| 5,887,892 A | 3/1999 | Burdack et al. | 280/731 |
| 6,010,147 A * | 1/2000 | Brown | 280/728.2 |
| 6,076,854 A | 6/2000 | Schenck et al. | 280/743.2 |
| 6,120,057 A | 9/2000 | Adomeit et al. | 280/731 |
| 6,161,866 A | 12/2000 | Ryan et al. | |
| 6,164,685 A * | 12/2000 | Fischer et al. | 280/728.3 |
| 6,168,187 B1 | 1/2001 | Yamada et al. | 280/728.3 |
| 6,180,207 B1 | 1/2001 | Preisler et al. | 428/139 |
| 6,203,061 B1 | 3/2001 | Niederman et al. | |
| 6,213,502 B1 | 4/2001 | Ryan et al. | |
| 6,247,724 B1 | 6/2001 | Jambor et al. | 280/731 |
| 6,247,726 B1 | 6/2001 | Ryan | |
| 6,254,121 B1 | 7/2001 | Fowler et al. | 280/729 |
| 6,334,627 B1 | 1/2002 | Heym et al. | 280/743.2 |
| 6,371,517 B1 | 4/2002 | Webber et al. | |
| 6,390,501 B1 | 5/2002 | Greib et al. | 280/743.2 |
| 6,422,597 B1 | 7/2002 | Pinsenschaum et al. | 280/735 |
| 6,431,596 B1 | 8/2002 | Ryan et al. | |
| 6,439,603 B2 | 8/2002 | Damman et al. | |
| 6,454,300 B1 | 9/2002 | Dunkle et al. | 280/742 |
| 6,460,880 B1 * | 10/2002 | Gallagher et al. | 280/732 |

(Continued)

FOREIGN PATENT DOCUMENTS

DE  197 49 914 A1  5/1999

(Continued)

*Primary Examiner*—Paul N. Dickson
*Assistant Examiner*—Laura B. Rosenberg
(74) *Attorney, Agent, or Firm*—Scott A. McBain

(57) ABSTRACT

An air bag system for cushioning restraint of a vehicle occupant during an impact event. The air bag assembly includes an inflatable air bag cushion adapted to be inflated from a storage chamber to an inflated deployed condition within an occupant compartment. A gas emitting inflator is housed in fluid communication with the air bag cushion. At least one drag-inducing member engages the air bag cushion as the air bag cushion is inflated from the stored condition to the inflated deployed condition such that the period of energy transfer between the air bag cushion and the occupant is increased relative to unrestrained deployment from the storage chamber.

3 Claims, 17 Drawing Sheets

U.S. PATENT DOCUMENTS

| | | |
|---|---|---|
| 6,499,765 B2 | 12/2002 | Hawthorn et al. |
| 6,561,545 B2 | 5/2003 | Greib et al. |
| 6,581,958 B2 * | 6/2003 | Holtz .................... 280/728.3 |
| 6,592,146 B2 | 7/2003 | Pinsenschaum et al. |
| 2002/0130495 A1 * | 9/2002 | Lotspih et al. .......... 280/730.2 |
| 2003/0001366 A1 * | 1/2003 | Debler et al. ............... 280/732 |
| 2003/0184059 A1 * | 10/2003 | Karlsson et al. ........ 280/728.3 |
| 2003/0197358 A1 * | 10/2003 | Hawthorn et al. ....... 280/743.1 |
| 2004/0178615 A1 * | 9/2004 | Florsheimer et al. .... 280/743.2 |
| 2004/0195810 A1 * | 10/2004 | Dietze et al. ............... 280/732 |

FOREIGN PATENT DOCUMENTS

JP         11129842 A  *  5/1999

* cited by examiner

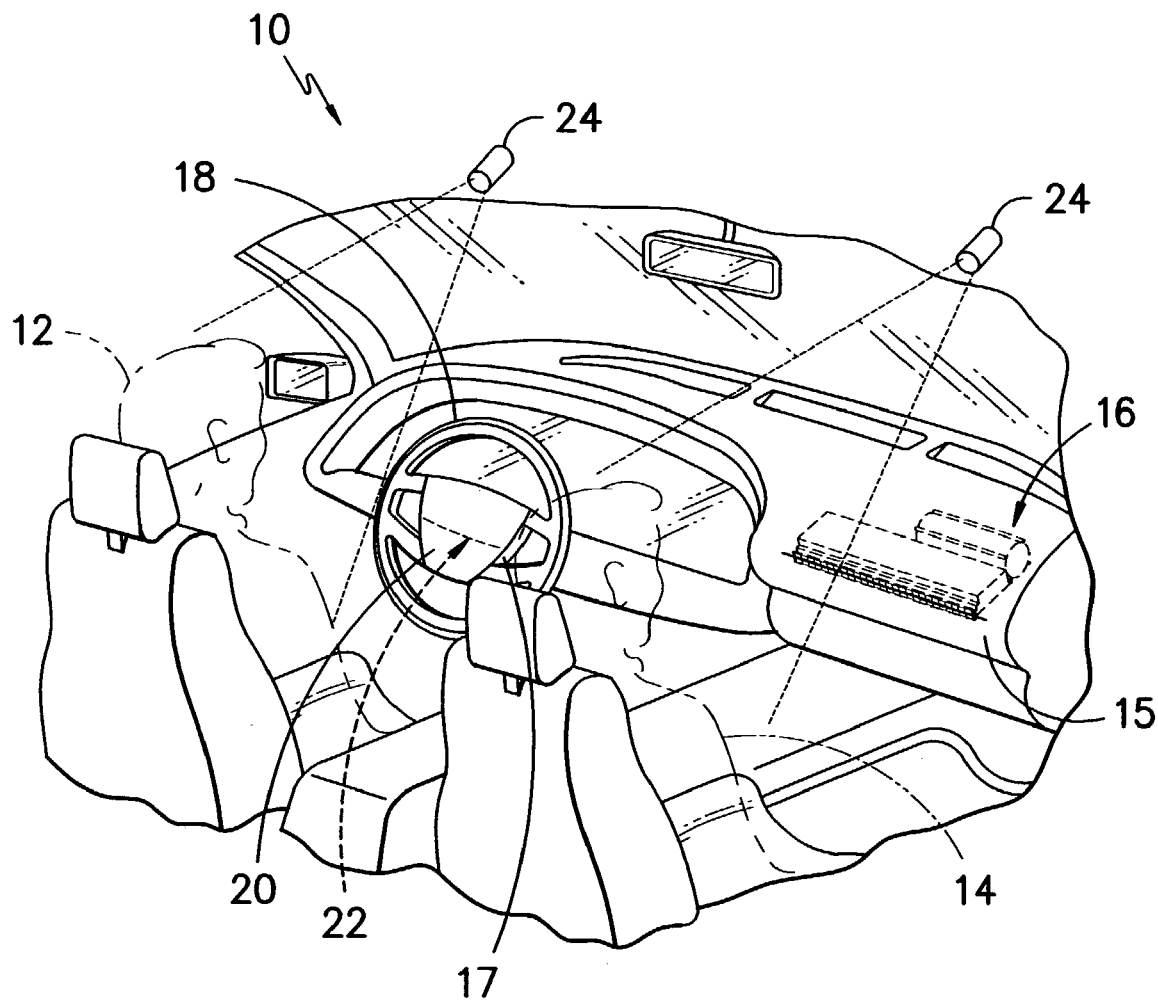
FIG. −1−

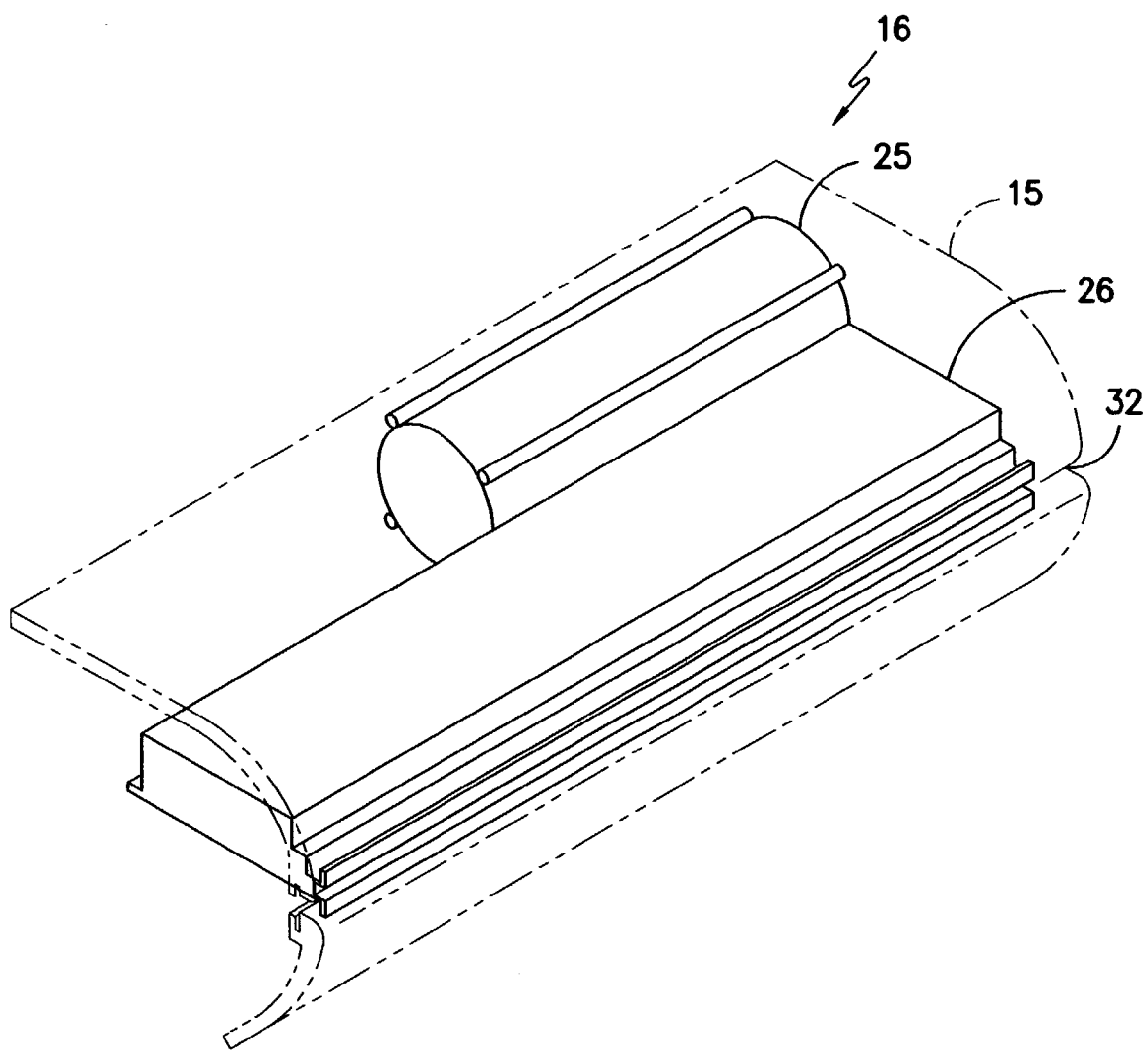
FIG. —2—

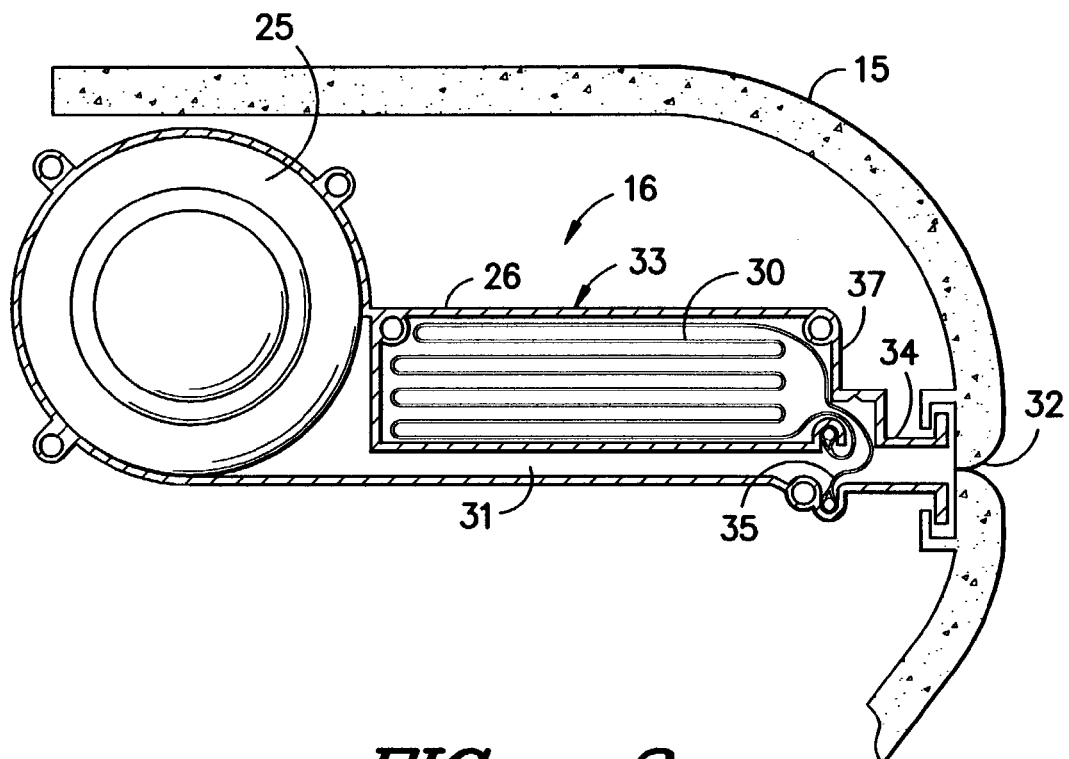
FIG. -3-
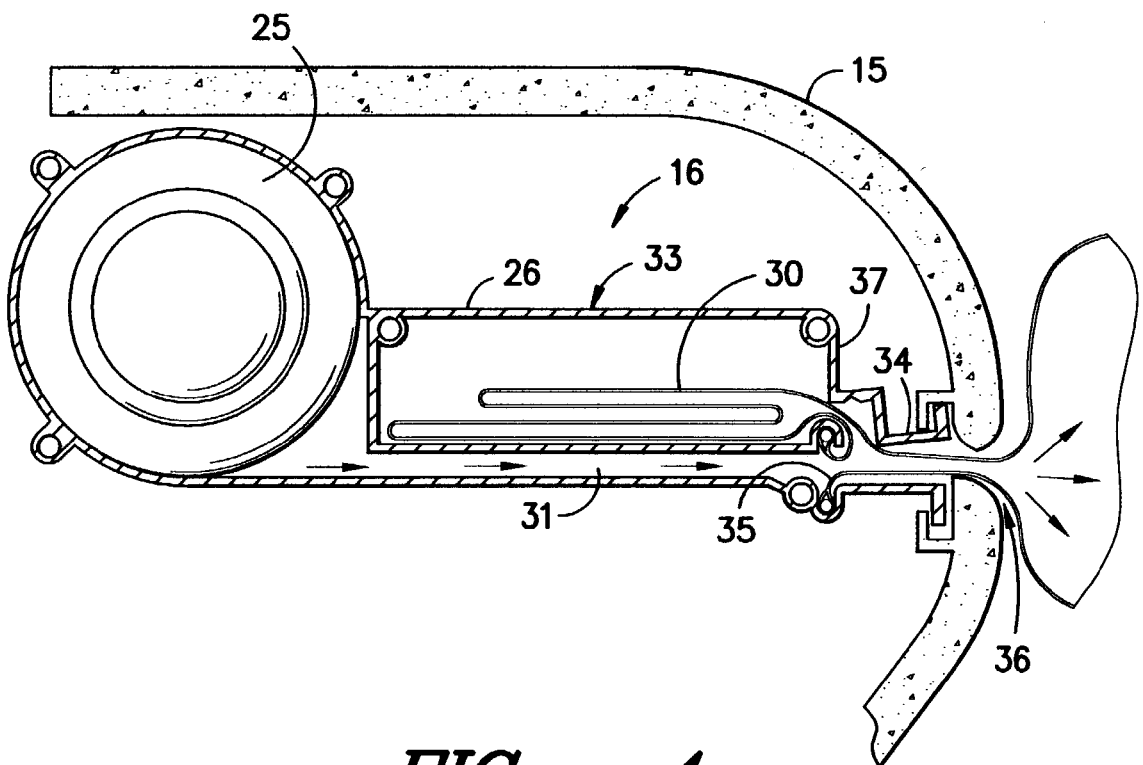
FIG. -4-

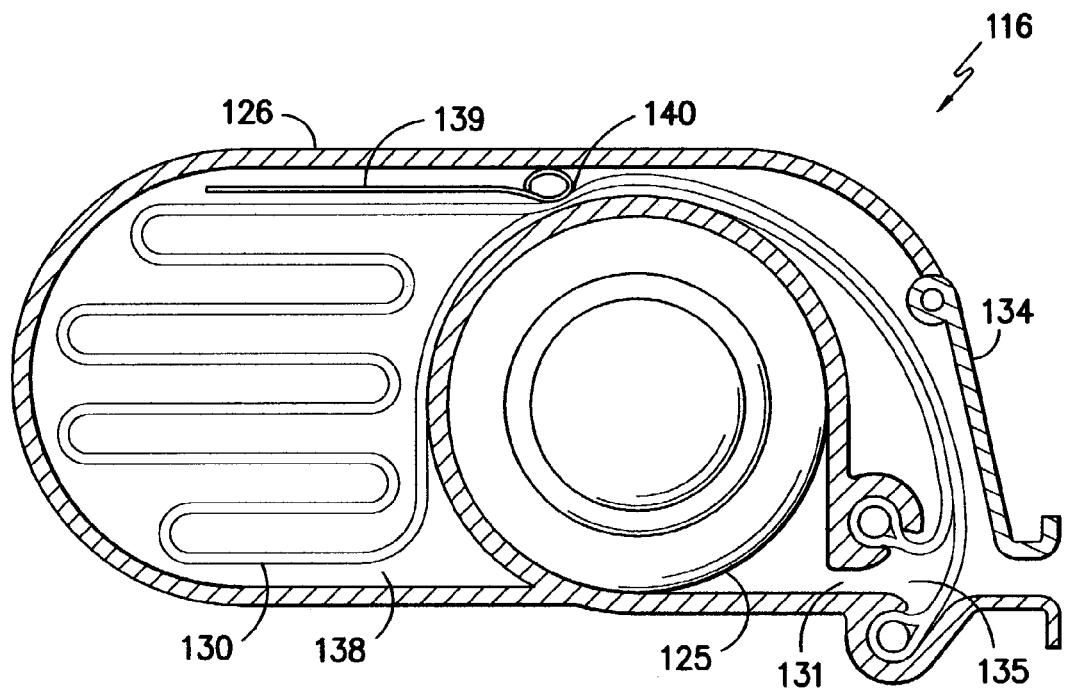
FIG. -5-
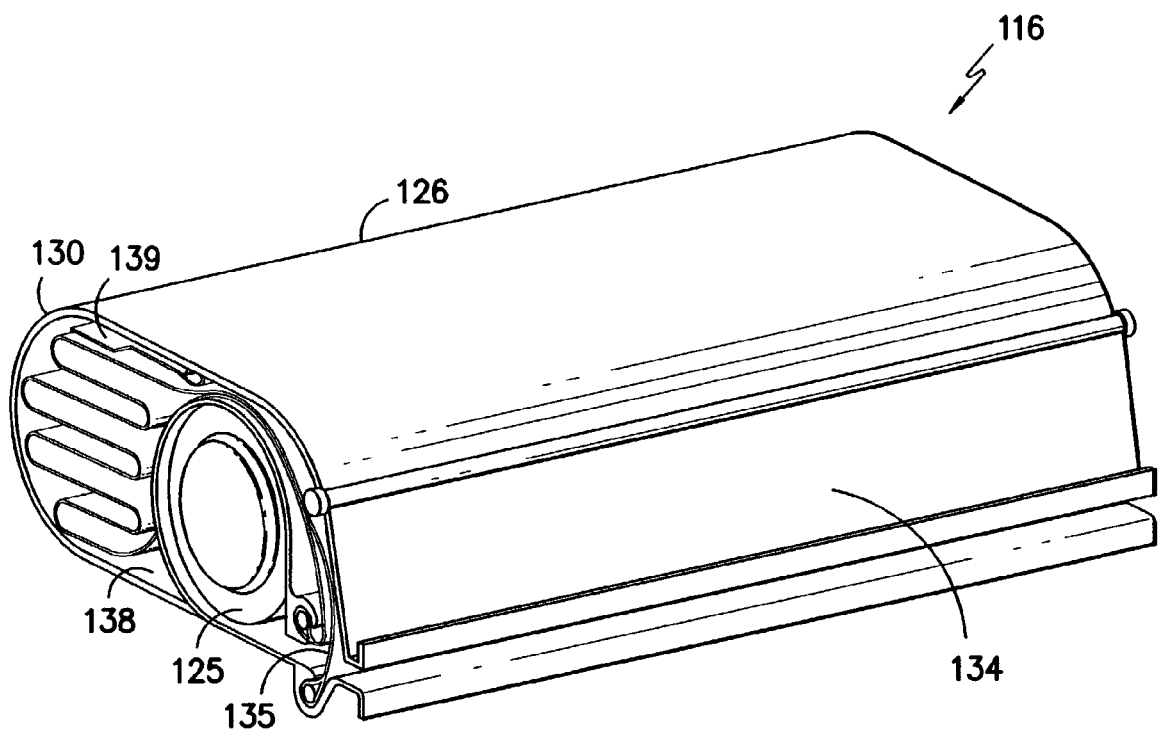
FIG. -6-

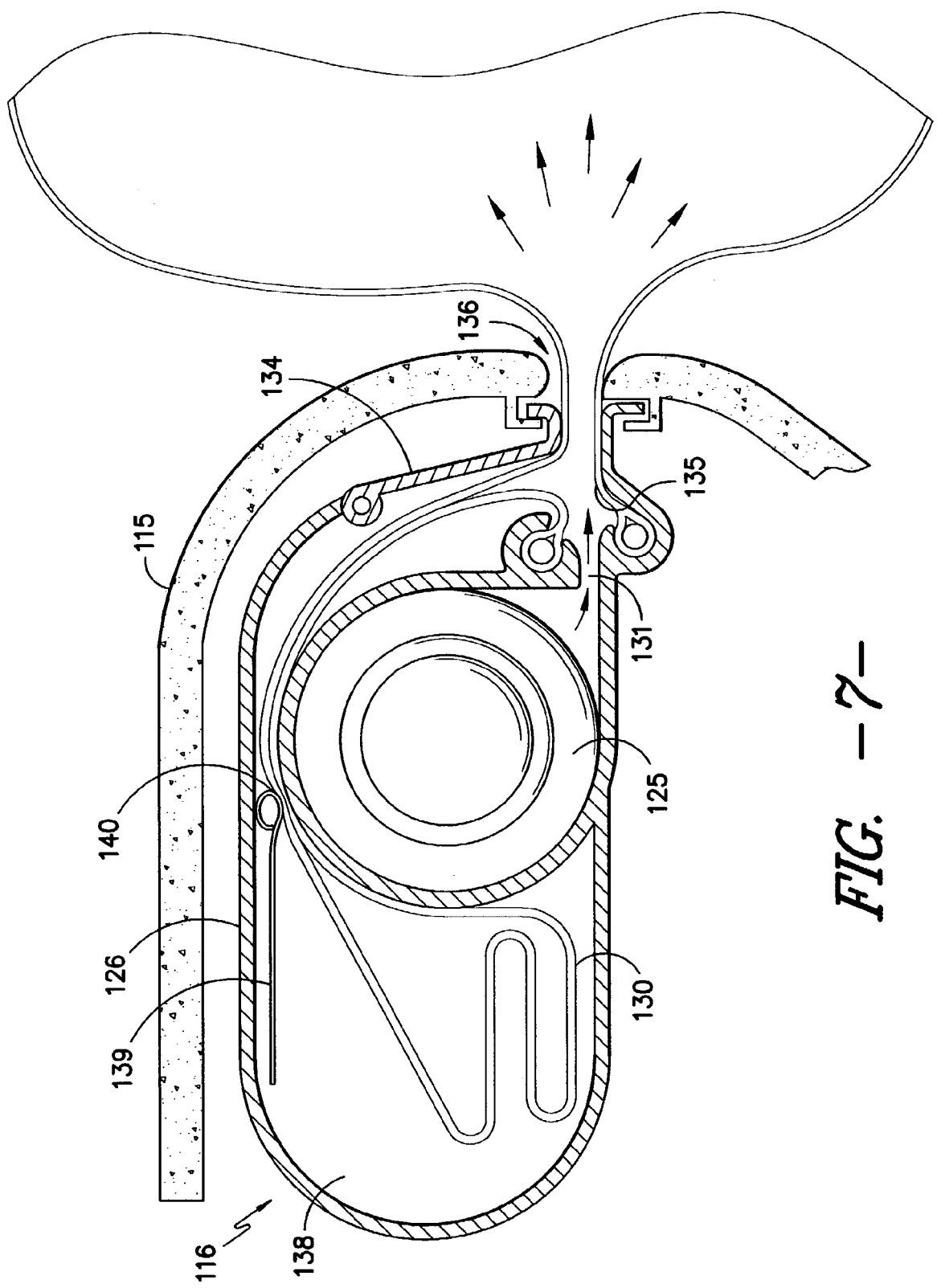
FIG. -7-

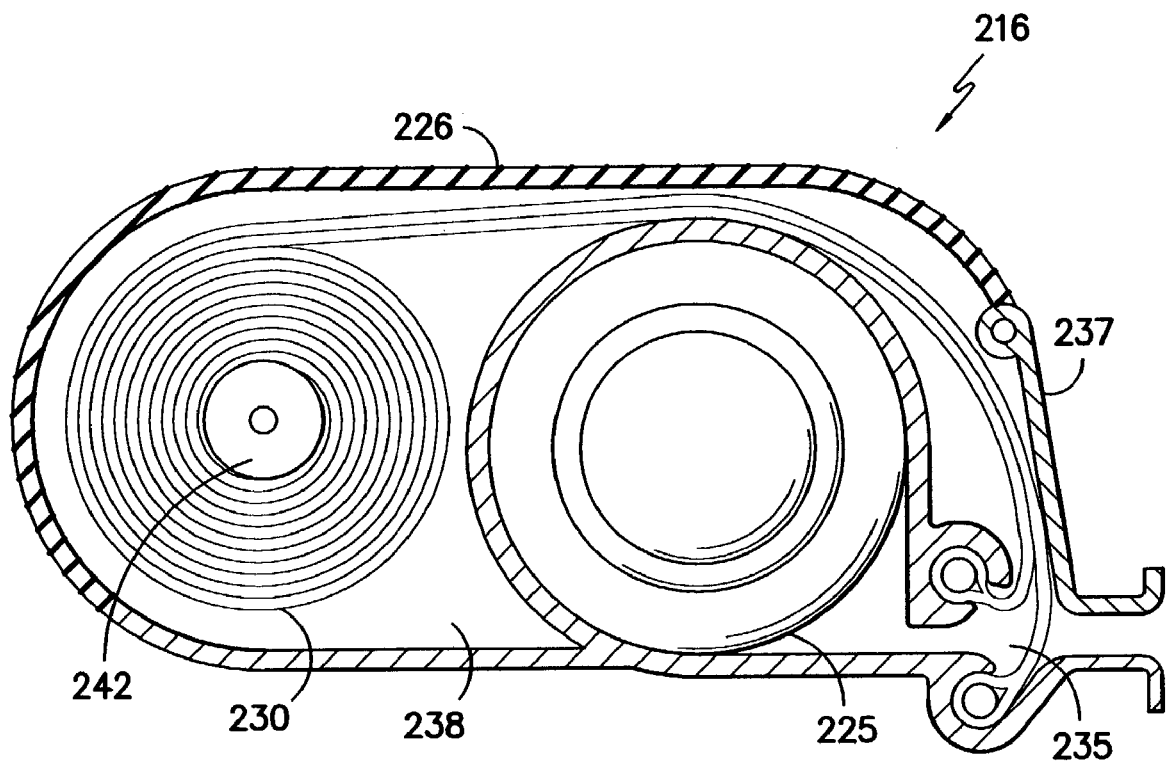
FIG. -8-

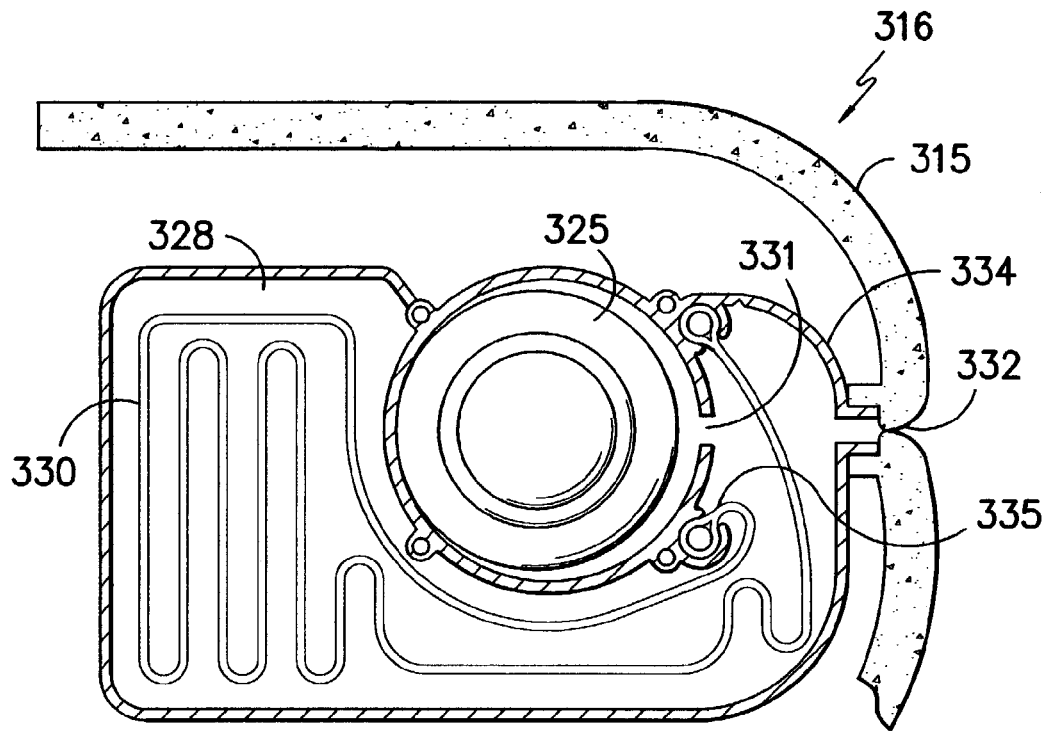
FIG. -9-
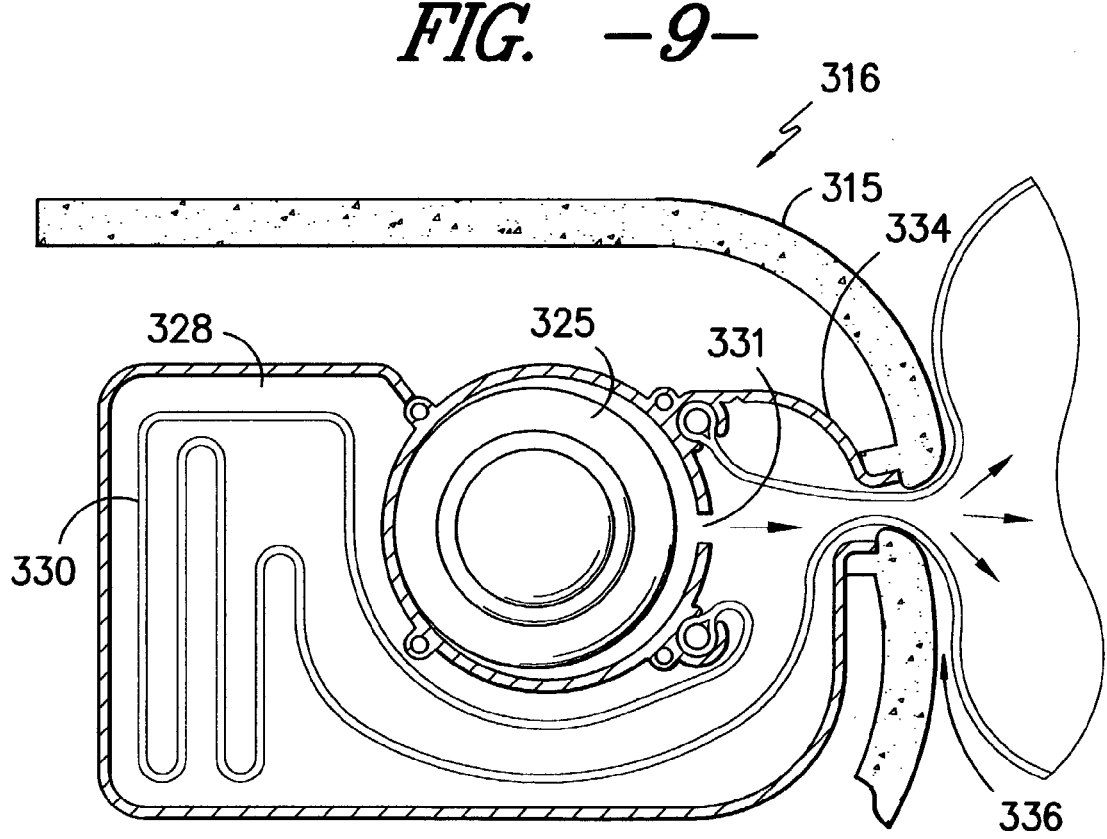
FIG. -10-

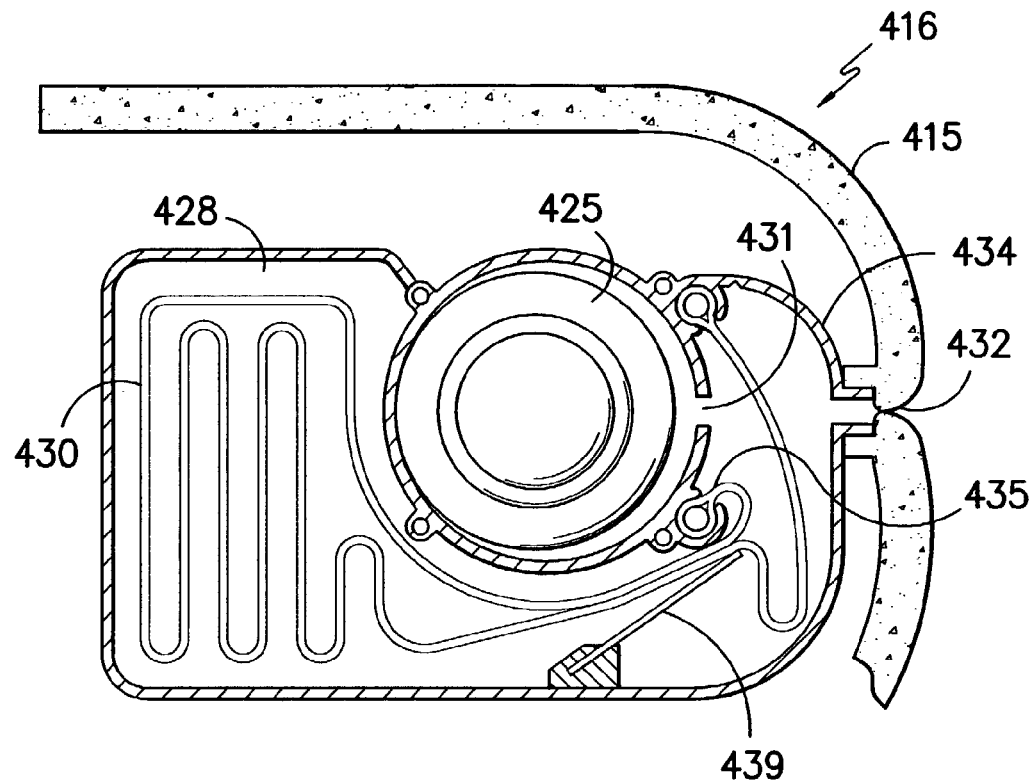
FIG. -11-
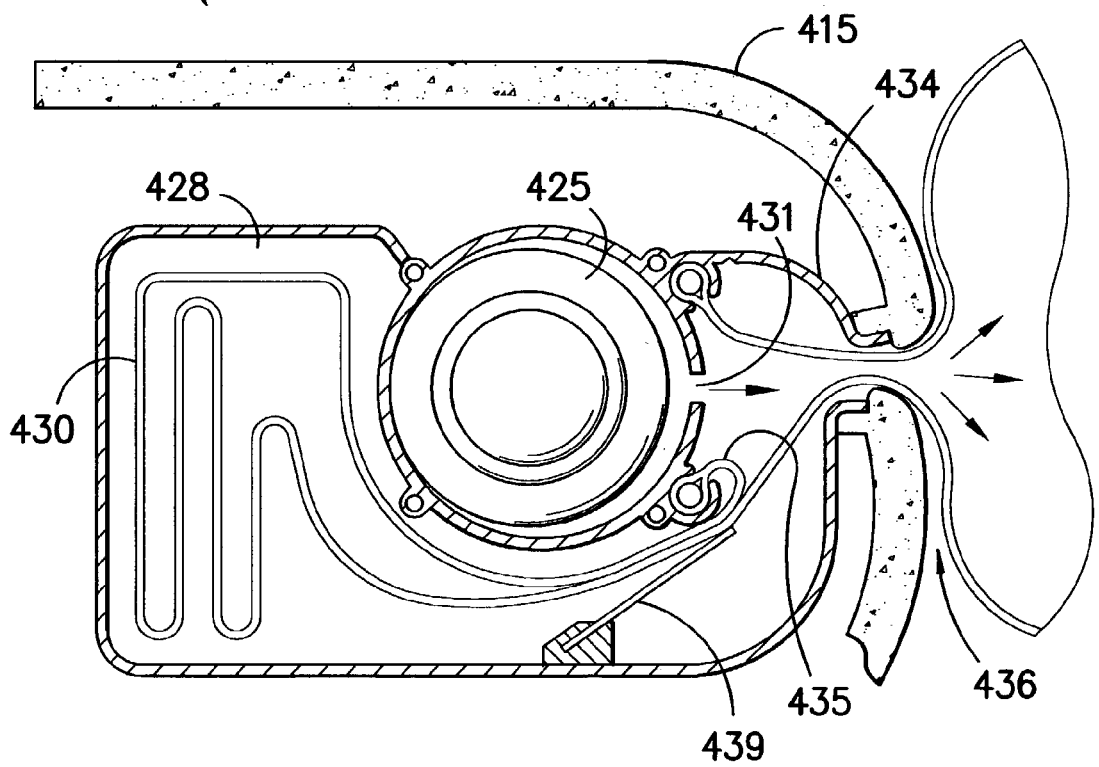
FIG. -12-

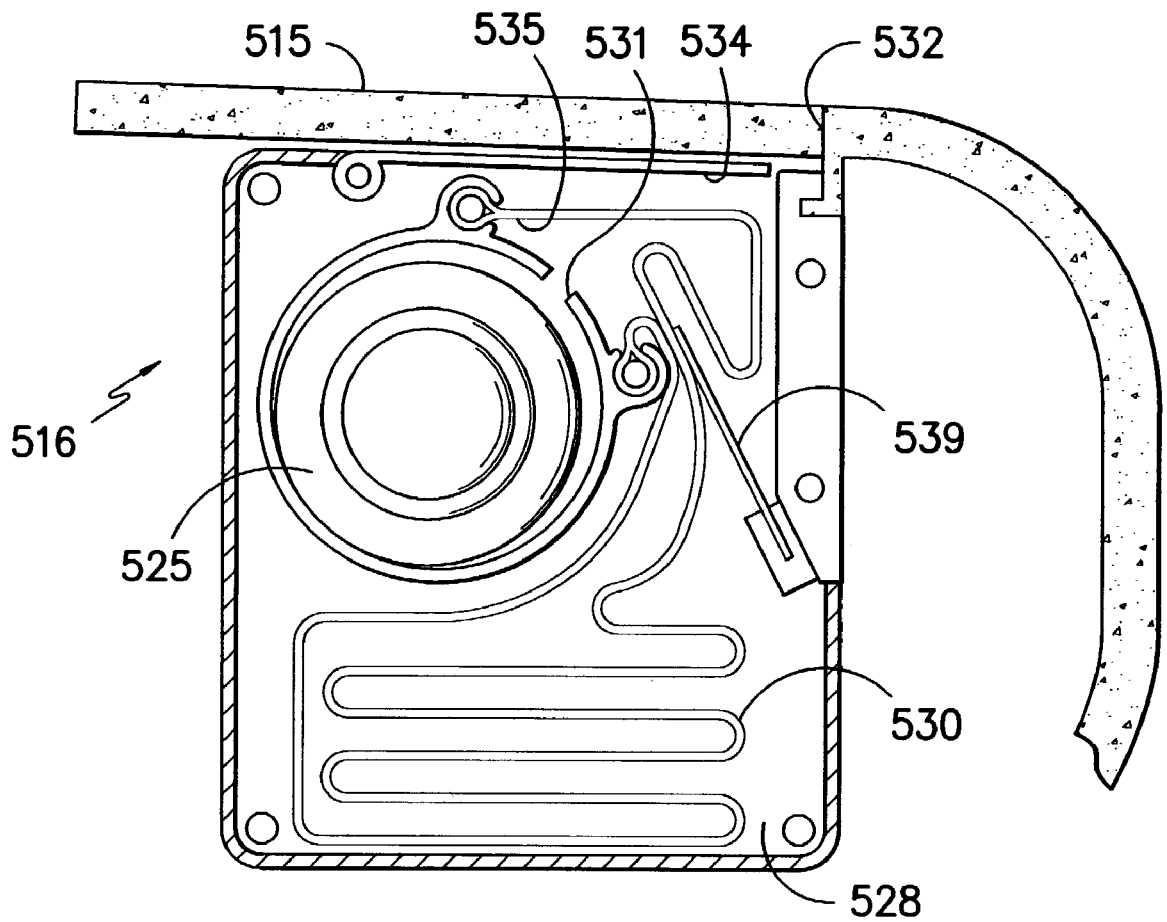
FIG. −13−

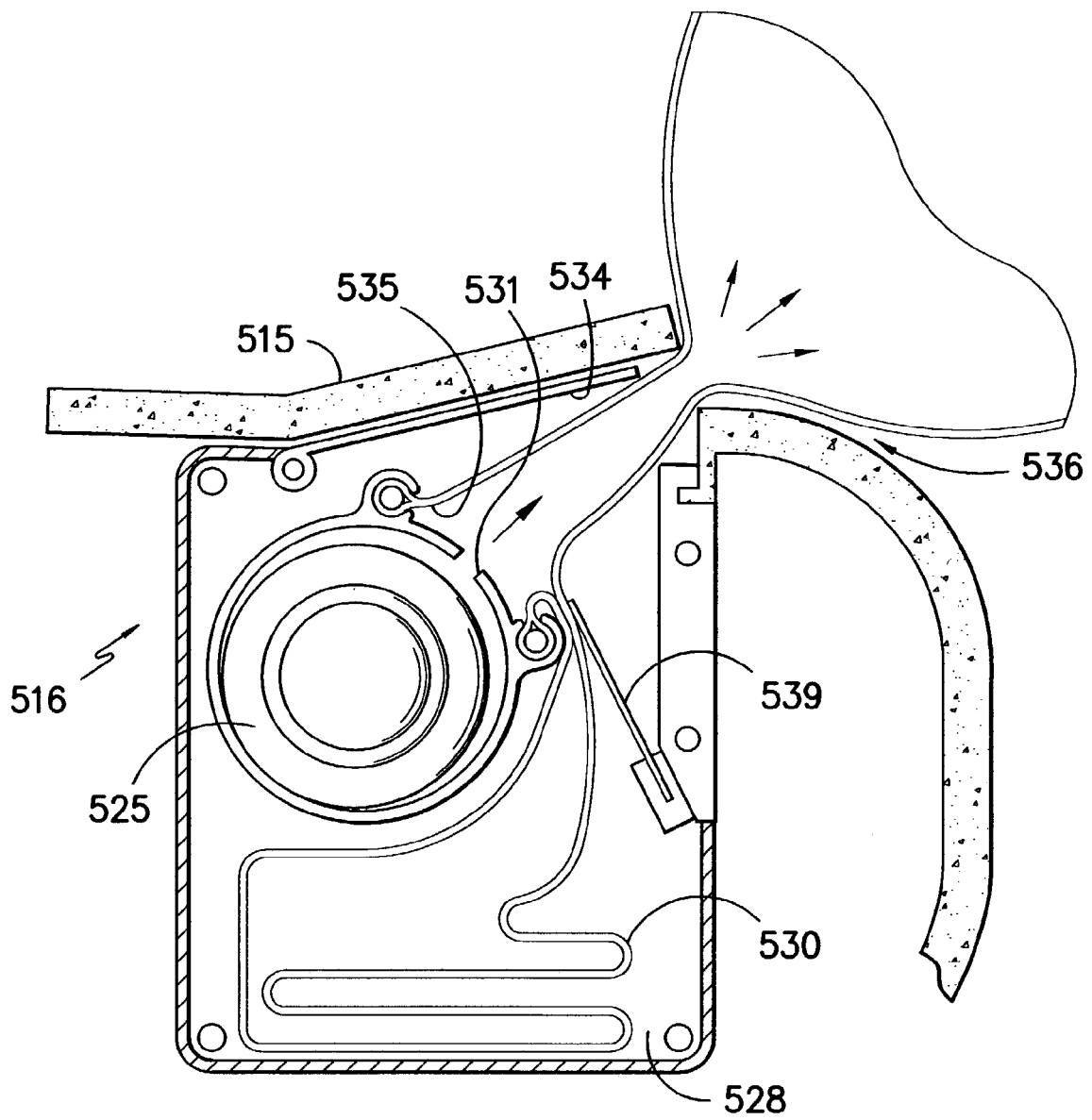
FIG. —14—

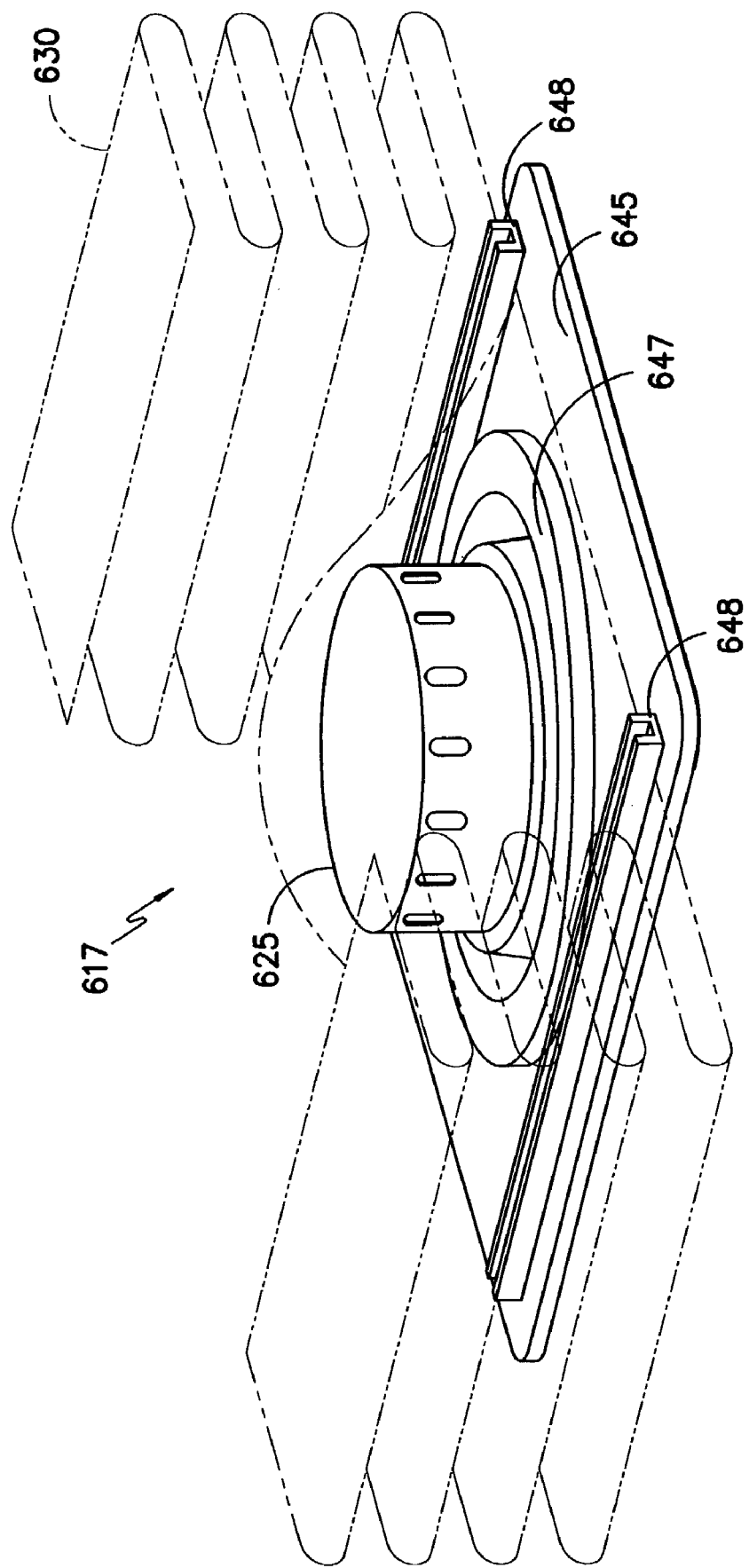
FIG. -15-

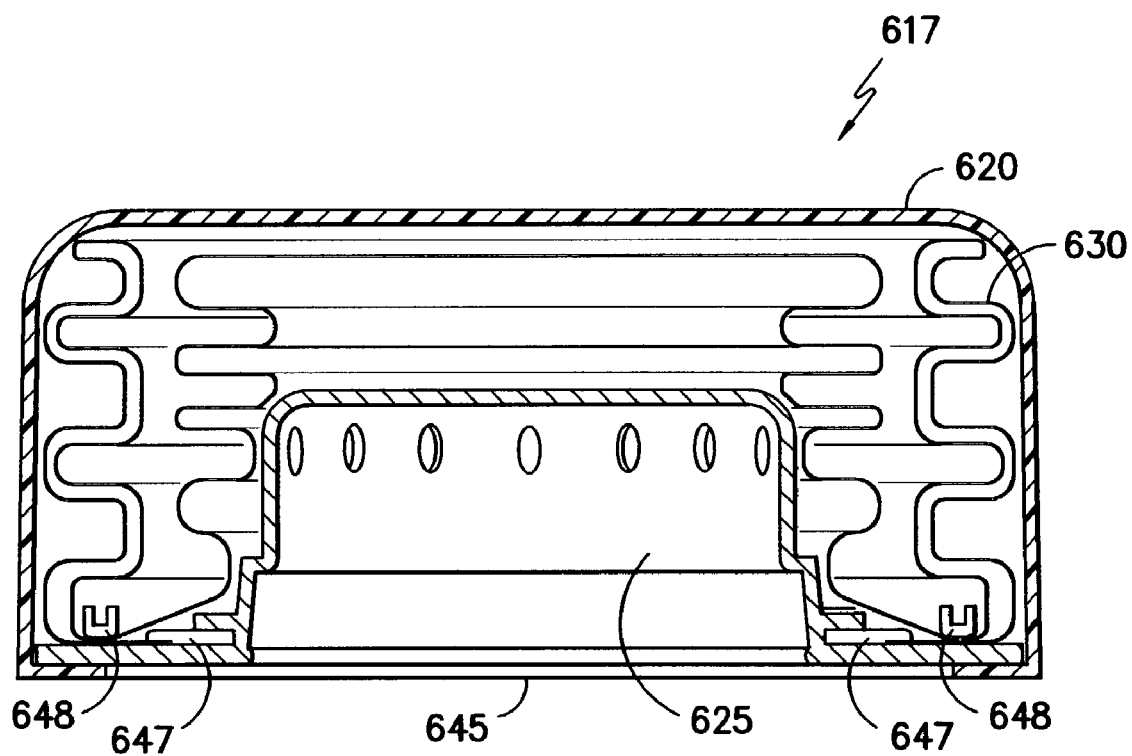
FIG. -16-

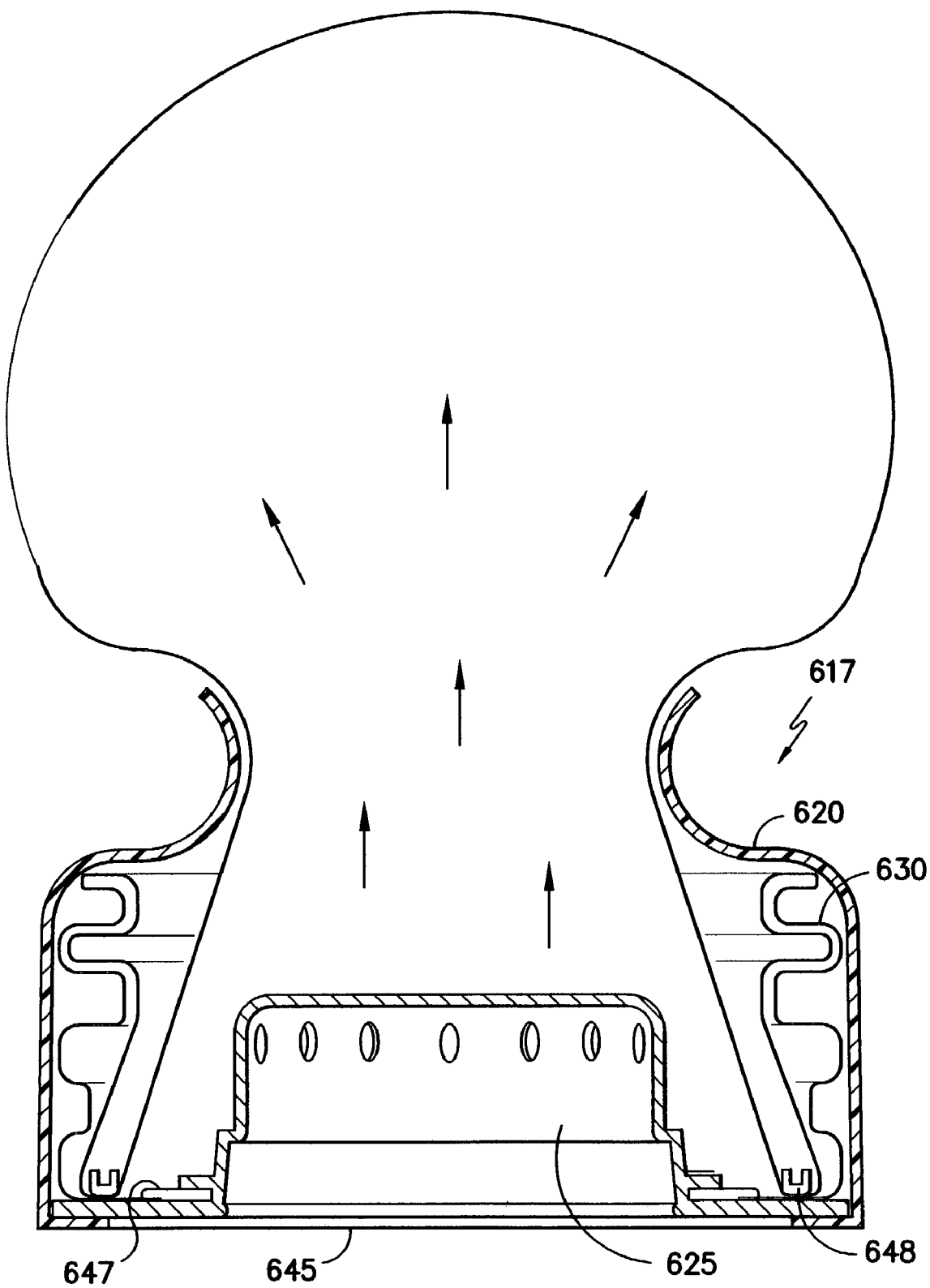
FIG. -17-

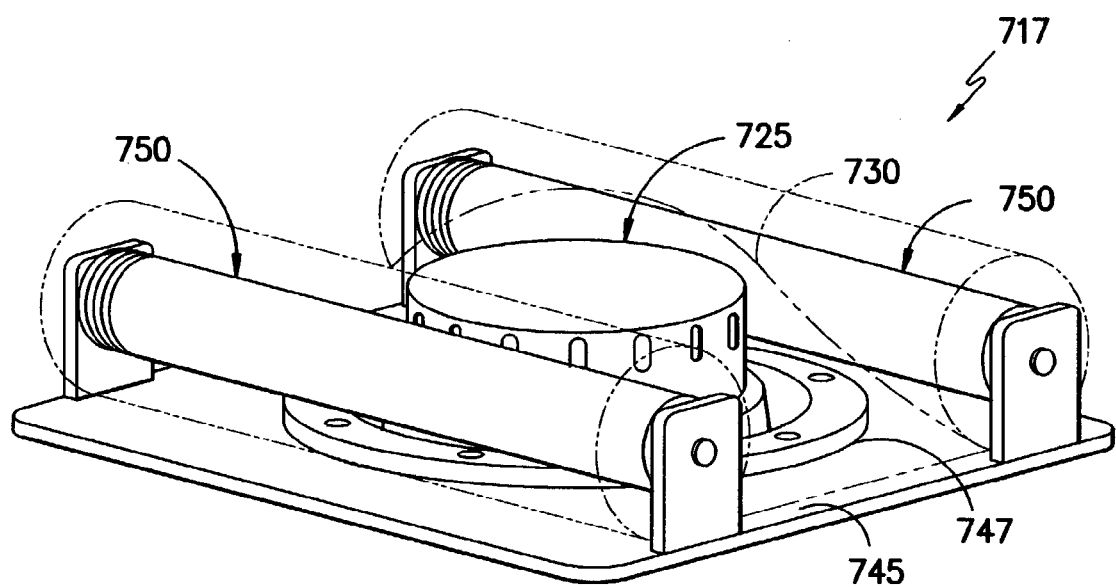
FIG. -18-
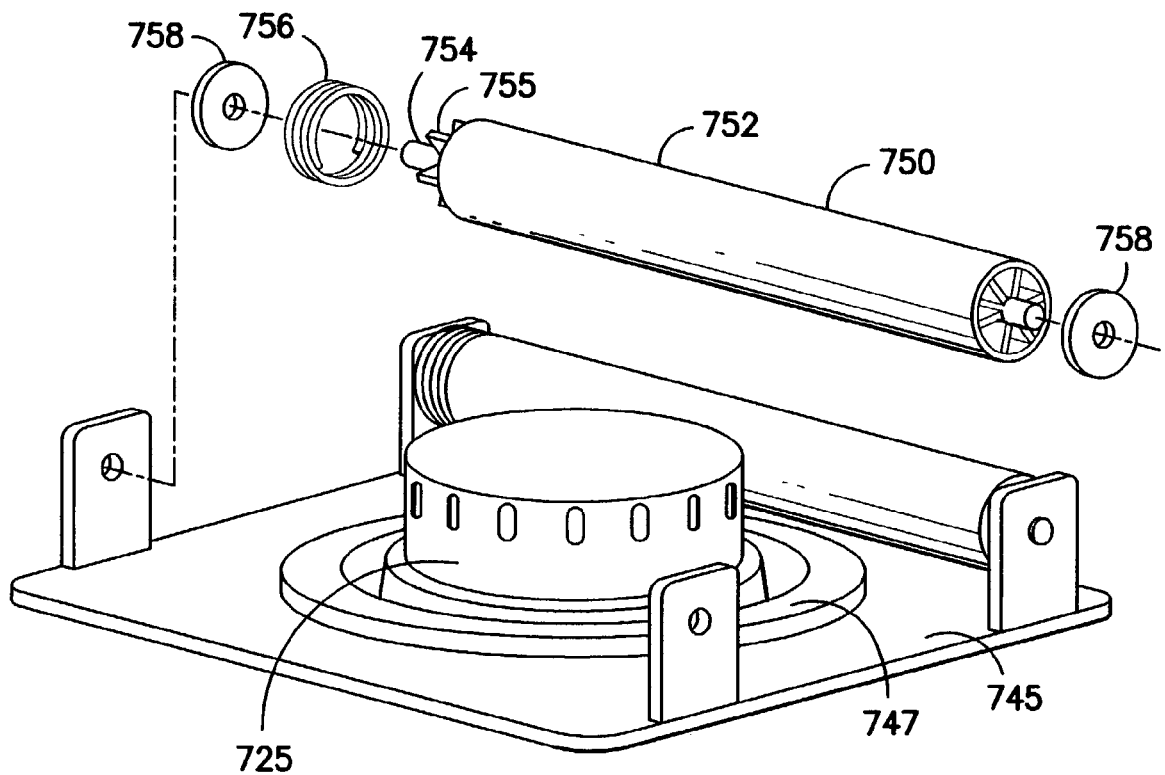
FIG. -19-

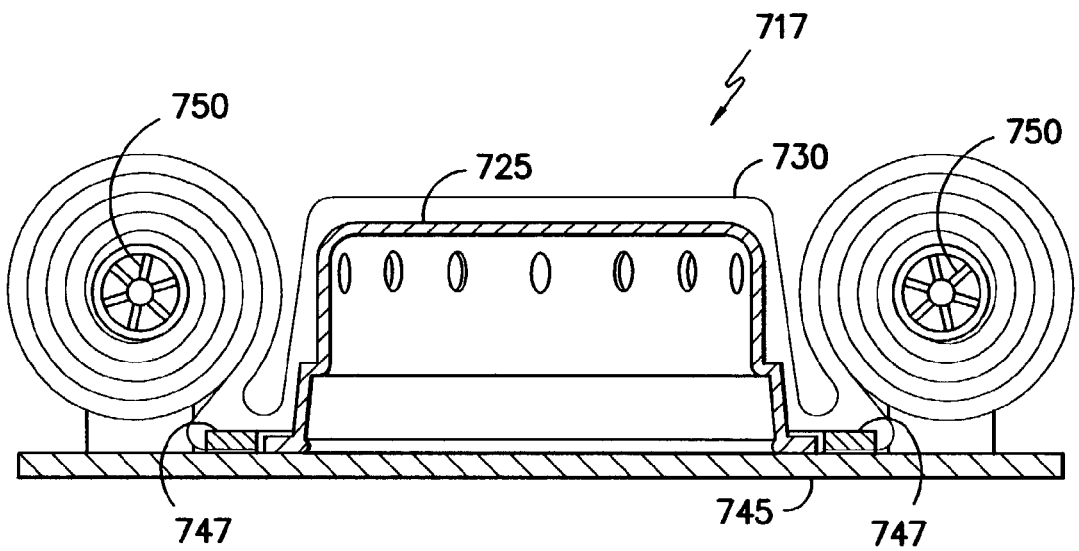
FIG. -20-
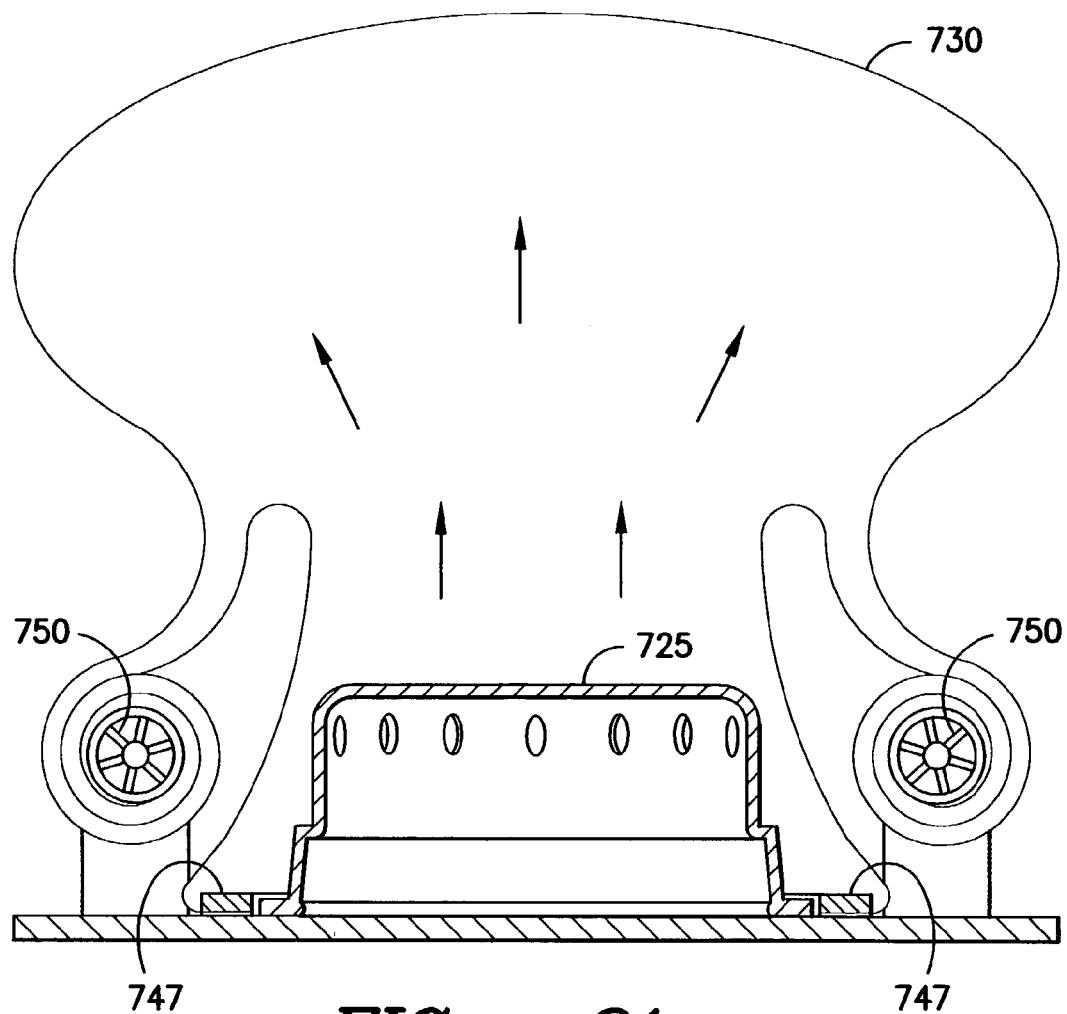
FIG. -21-

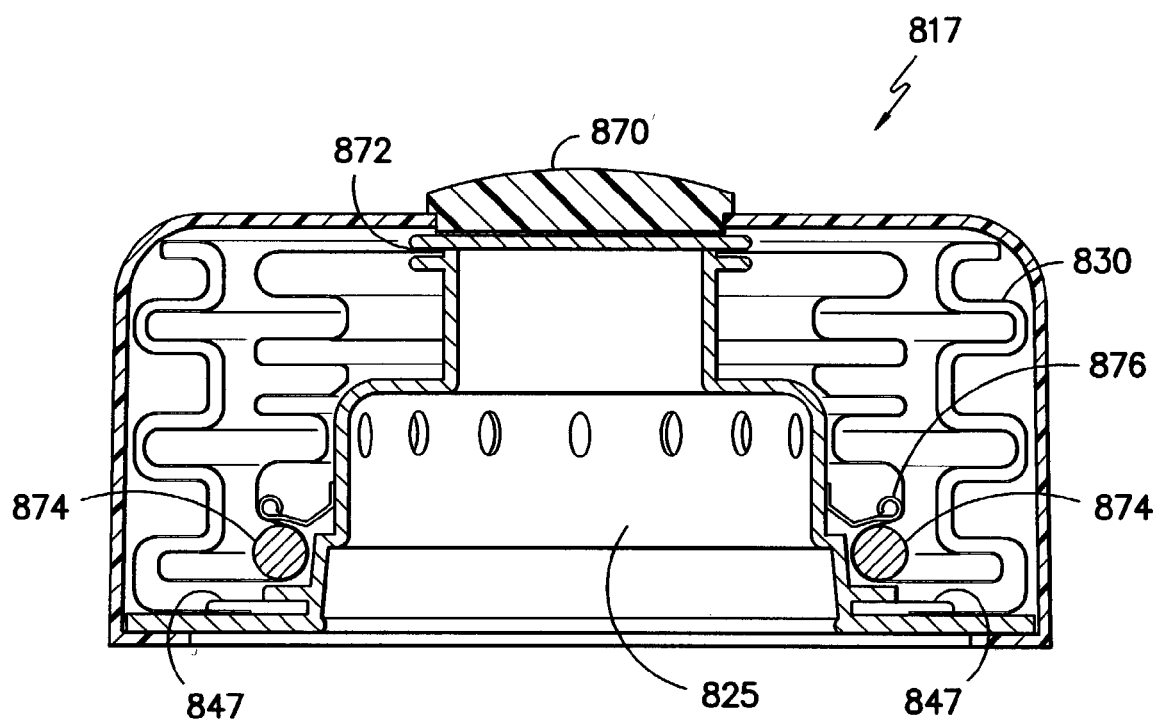
FIG. -22-
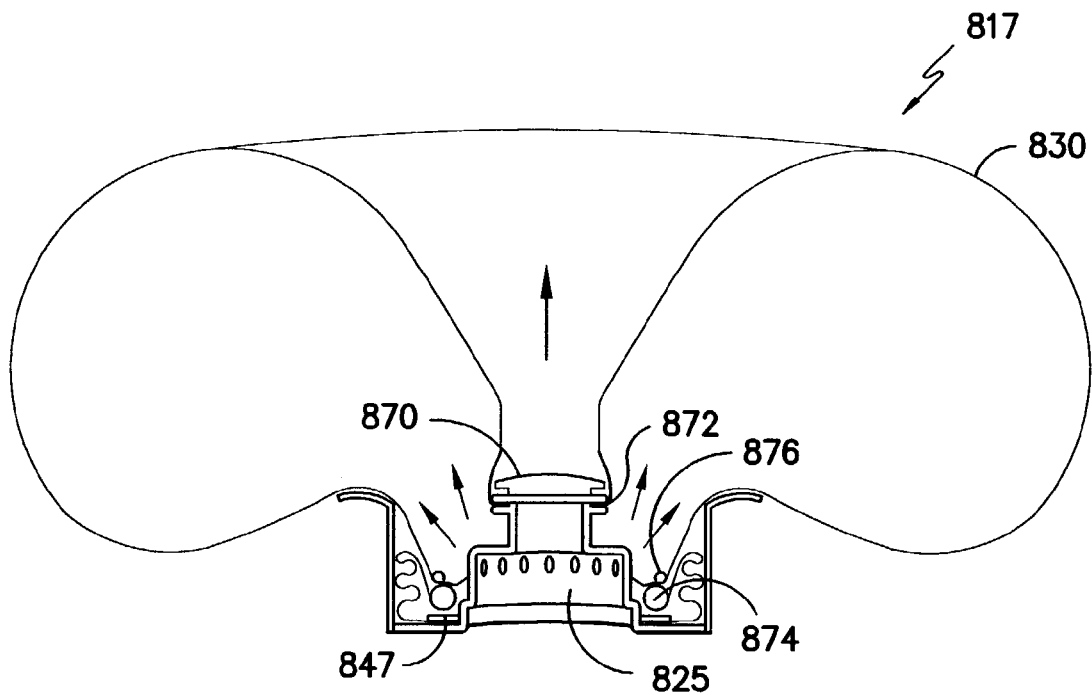
FIG. -23-

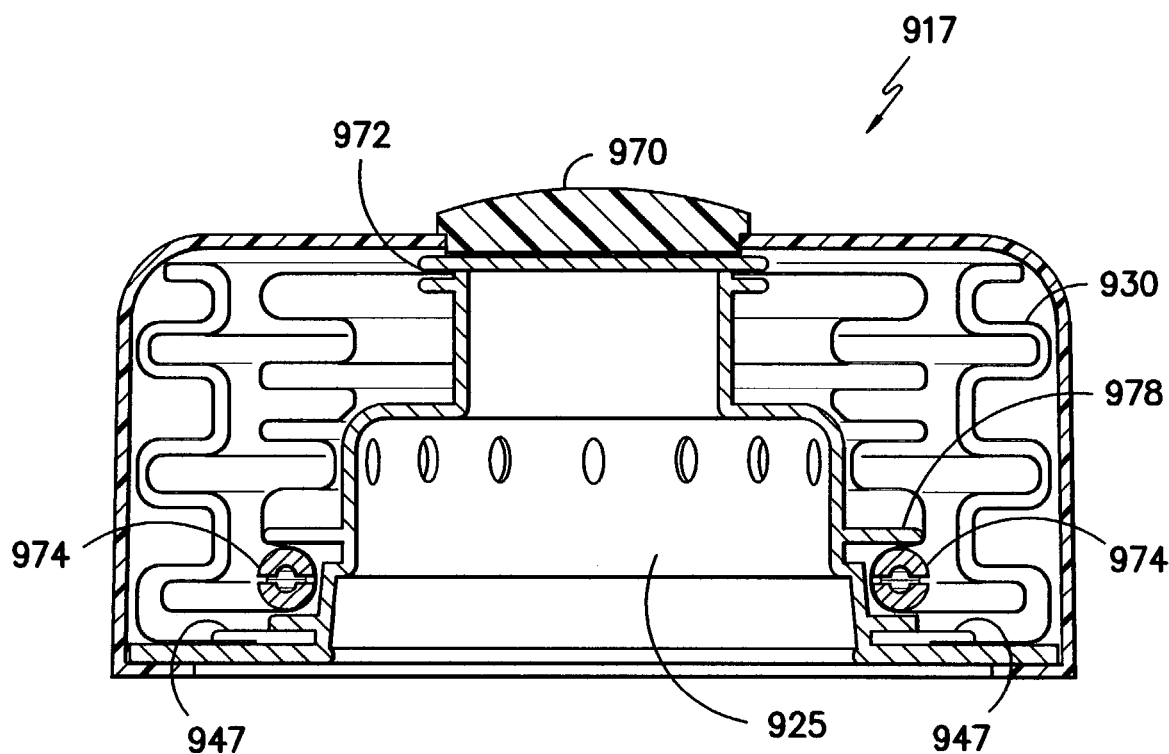
FIG. —24—
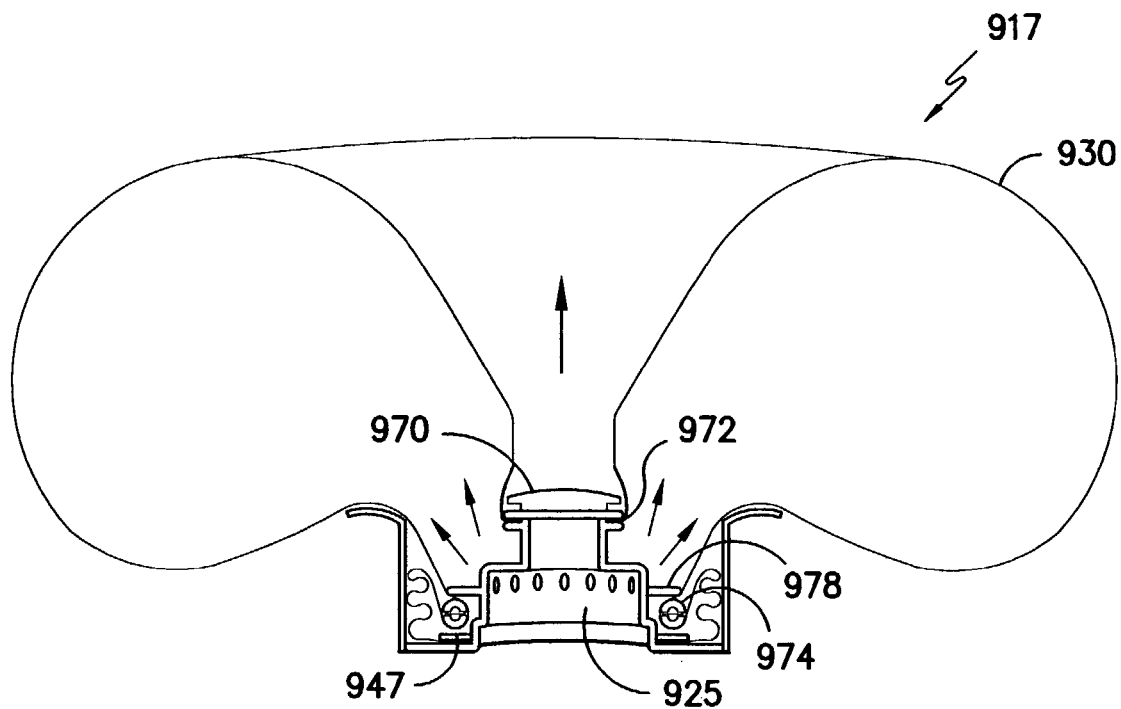
FIG. —25—

AIR BAG ASSEMBLY HAVING CONTROLLED CUSHION DEPLOYMENT

TECHNICAL FIELD

This invention relates to an air bag assembly, and more particularly to an air bag assembly including an inflatable air bag cushion inflated to an activated position under controlled restraint conditions such that the cushion expands in a controlled manner under the influence of a drag force. In particular, the assembly of the present invention avoids the occurrence of rapid and highly localized cushion punch out while also prolonging the period of energy transfer between the cushion and an occupant to be protected.

BACKGROUND OF THE INVENTION

It is well known to provide an air bag assembly including an inflatable air bag cushion for protecting the occupant of a transportation vehicle. In an automotive vehicle such air bag assemblies are typically located in the hub of the steering wheel and in a recess in the vehicle instrument panel for protection of the vehicle occupants seated in opposing relation to such assemblies. Additional air bag assemblies may be located within the seats and/or door panels for protection of occupants during a side impact event. Air bag assemblies typically include an inflatable cushion, and a gas emitting inflator mounted in fluid communication with the inflatable cushion.

In a driver side air bag module, the inflator is typically supported at the interior of the steering wheel or other appropriate location opposing the occupant to be protected. The mouth of the air bag is disposed in surrounding relation to the inflator. In a passenger side assembly, the inflator is typically held within a trough-like housing with the air bag cushion being held along the walls of the housing such that inflation gas passes from the inflator into the cushion upon activation of the inflator. In typical prior assemblies, upon the introduction of inflation gas to the air bag cushion, a pressure is established within the cushion causing egress from the storage location though a relatively large opening. Absent restraint, the cushion tends to extend first outwardly in a direction away from the storage location followed by radial expansion as filling is completed. Tethering techniques may be used to control the expanded dimensions of the cushion.

SUMMARY OF THE INVENTION

The present invention provides advantages and alternatives over the prior art by providing air bag assemblies which provide a restraining drag force to the air bag cushion during ejection of the air bag cushion from the storage location such that the material forming the air bag cushion undergoes a more gradual payout from the storage location during the filling operation. That is, tensioning control is maintained substantially during the filling process. It is believed that such a gradual payout promotes concurrent axial and lateral cushion inflation thereby avoiding rapid localized punch out while at the same time prolonging the period over which energy is transferred between the cushion and an occupant to be protected.

According to one aspect of the present invention, various restraining payout arrangements are provided for controllably releasing material forming the air bag cushion during the inflation operation.

According to another aspect of the invention, an air bag assembly is provided which is adapted to deploy an inflatable air bag cushion through a narrow extended seam opening in opposing relation to an occupant to be protected. Early stage lateral expansion along the length of the seam opening is thereby promoted so as to avoid excessive punch out inflation characteristics. In addition, no need exists for a large deployment door or flap in covering relation to the cushion.

BRIEF DESCRIPTION OF THE DRAWINGS

The present invention will now be described by way of example only, with reference to the accompanying drawings which constitute a part of the specification herein and in which:

FIG. 1 is a view of the interior of an automotive vehicle incorporating driver side and passenger side air bag modules;

FIG. 2 is a perspective view of an air bag module adapted to deploy an air bag cushion through an extended narrow seam opening;

FIG. 3 is a cut-away schematic side view of the air bag module of FIG. 2 prior to inflation of the air bag cushion;

FIG. 4 is a view similar to FIG. 3, during initial inflation of the air bag cushion;

FIG. 5 is a cut-away view similar to FIG. 3 illustrating an alternative storage arrangement for an inflatable air bag cushion and inflator;

FIG. 6 is a perspective view of an air bag module utilizing the storage arrangement of FIG. 5;

FIG. 7 is a view similar to FIG. 5 during initial inflation of the air bag cushion;

FIG. 8 is a cut-away view similar to FIG. 5 illustrating an alternative storage arrangement for an inflatable air bag cushion and inflator;

FIG. 9 is a cut-away view similar to FIG. 5 illustrating a storage arrangement for an inflatable air bag cushion and inflator prior to inflation of the air bag cushion;

FIG. 10 is a view similar to FIG. 9 during initial inflation of the air bag cushion;

FIG. 11 is a view similar to FIG. 9 incorporating an internal pinch point to restrict cushion payout;

FIG. 12 is a view similar to FIG. 11 during initial inflation of the air bag cushion;

FIG. 13 is a cut-away view illustrating a storage arrangement for an inflatable air bag cushion and inflator for deployment of the cushion through an opening at the top of an instrument panel;

FIG. 14 is a view similar to FIG. 13 during initial inflation of the air bag cushion;

FIG. 15 is a schematic view illustrating a simplified restraining drag arrangement for an inflatable air bag cushion;

FIG. 16 is a cut-away view of an air bag module incorporating a pinch bar drag restraint prior to inflation of the air bag cushion;

FIG. 17 is a view similar to FIG. 16 during inflation of the air bag cushion;

FIG. 18 is a view similar to FIG. 15 incorporating an alternative restraining drag arrangement in the form of tensioned rolls with the air bag material shown in phantom lines;

FIG. 19 is an exploded view illustrating a tensioned roll from FIG. 18;

FIG. 20 is a cut-away view of an air bag module incorporating a roller bar drag restraint arrangement prior to inflation of the air bag cushion;

FIG. 21 is a view similar to FIG. 20 during inflation of the air bag cushion;

FIG. 22 is a cut-away view of an air bag module incorporating a drag restraint assembly and a torroidal air bag cushion prior to inflation of the air bag cushion;

FIG. 23 is a view similar to FIG. 22 during inflation of the air bag cushion;

FIG. 24 is a cut-away view of an air bag module incorporating a drag restraint assembly and a torroidal air bag cushion prior to inflation of the air bag cushion; and FIG. 25 is a view similar to FIG. 24 during inflation of the air bag cushion.

While the invention has been illustrated and generally described above, it will hereinafter be described in connection with certain exemplary embodiments, constructions and procedures, it is to be understood that in no event is the invention to be limited to such illustrated and described embodiments, constructions and procedures. On the contrary, it is intended that the present invention shall extend to all alternatives and modifications as may embrace the principles of this invention within the true spirit and scope thereof.

DESCRIPTION OF THE PREFERRED EMBODIMENT

Reference will now be made to the drawings wherein to the extent possible like reference numerals are utilized to designate like components throughout the various views. In FIG. 1, there is illustrated the interior of a vehicle 10 for transporting an operator 12 and a passenger 14. As illustrated, the vehicle 10 may include a passenger side air bag system 16 mounted within the dash panel 15 in substantially opposing relation to the vehicle passenger 14. The vehicle 10 may also include a driver side air bag system 17 mounted within the steering wheel 18 for protection of the vehicle operator 12. According to a potentially preferred practice, the air bag assembly mounted within the steering wheel 18 is stored in hidden relation below a cover 20 which opens along a tear seam 22 which may be of any desired configuration upon activation of the air bag assembly. Such activation typically takes place upon the occurrence and measurement of predetermined vehicle conditions such as deceleration at a rate exceeding a predetermined value.

As shown, the vehicle 10 may incorporate one or more sensors 24 such as optical sensors for measuring the dimensions of the vehicle occupants 12, 14. Likewise, mass and/or position sensors (not shown) may be incorporated within the seaming structure and/or at other suitable locations to provide further information on the characteristics of the vehicle occupants. A sensor may also be provided to register whether or not the occupants are utilizing recommended seat belts. Data from the various sensors measuring occupant parameters as well as data from sensors measuring vehicle conditions may be translated to an onboard computer which in turn relays deployment activation signals to the driver side air bag system 17 and the passenger side air bag system 16 during a collision event.

Referring to FIGS. 2–4, a first arrangement for a passenger side air bag system 16 is illustrated in underlying relation to the dash panel 15. As shown, the air bag system 16 includes a gas emitting inflator 25 and a cushion housing 26 holding a folded inflatable air bag cushion 30. The air bag system 16 also includes a gas conveyance channel 31 such as a diffusion plenum in fluid communication with the inflator 25 so as to distribute inflation gas over a substantial lateral width within the air bag system 16. According to the illustrated arrangement, the air bag system 16 is disposed beneath the dash panel 15 behind an extended seam 32 which is oriented in a cross-vehicle direction. While the seam 32 is illustrated as being a visible surface seam, it is likewise contemplated that the seam may be internal to the surface of the dash panel 15 and thus hidden from view. In the illustrated arrangement, a biasing structure 33 having a plurality of depending resilient finger elements 37 disposed across the width of the cushion housing is provided so as to define a segmented drag barrier biasing against the air bag cushion during deployment (FIG. 4).

In the illustrated arrangement the biasing structure 33 includes a hinging lip portion 34 which aids in opening the seam 32. As best illustrated through simultaneous reference to FIGS. 3 and 4, prior to expulsion of inflation gas from the inflator 25 the air bag cushion 30 is stored within the cushion housing 26 with a mouth portion 35 of the air bag cushion 30 held in gas receiving relation to the gas conveyance channel 31. Upon the expulsion of inflation gas from the inflator 25, the inflation gas passes through the gas conveyance channel 31 and into the mouth portion 35 of the air bag cushion 30 so as to pressurize the portion of the air bag cushion 30 in the vicinity of the gas conveyance channel outlet. As gas is introduced into the air bag cushion 30, pressure is developed along the seam 32 until the seam 32 is caused to open thereby defining an elongated slotted cushion deployment opening 36 at the location of the seam 32 (FIG. 4). According to the illustrated arrangement, the development of the deployment opening 36 at the location of the seam 32 is facilitated by the pivoting action of the hinging lip portion 34 caused by the localized pressure within the air bag cushion 30.

Upon the development of the slotted deployment opening 36, a portion of the air bag cushion 30 is forced out of the opening 36 in the form of a bubble extending along the length of the deployment opening 36. The relatively narrow elongate slotted configuration of the opening 36 provides a drag force which aids in the prevention of localized punch out towards the occupant to be protected.

As will be appreciated, the actual configuration of the biasing element 33 may be the subject of substantial variation. In this regard, it is contemplated that the resilient finger elements 37 may be either in close proximity to one another or may be spaced substantially apart along the length of the biasing element 33. The material forming the finger elements 37 is preferably a substantially resilient material such as spring steel, resilient plastic or the like such that upon displacement during cushion deployment the finger elements 37 continue to bias back toward their starting position thereby applying a controlled drag force to the air bag cushion 30. Of course, it is also contemplated that the segmented flap 33 may be eliminated entirely if desired.

In FIGS. 5–7, another air bag system is illustrated wherein elements corresponding to those previously described are designated by like reference numerals increased by 100. As illustrated, the air bag system 116 includes a gas emitting inflator 125 and an air bag cushion 130 packaged within a modular housing 126. As illustrated, in this arrangement the body of the air bag cushion 130 is packaged at a storage chamber 138 positioned generally forward of the inflator 125 such that in the packaged state the inflator 125 is disposed between the seam defining the location of the slotted deployment opening 136 (FIG. 7) and the folded body portion of the air bag cushion 130. A segment of the air bag cushion 130 extends partially around the inflator 125 such that the mouth portion 135 of the air bag cushion 130 is held at the outlet of a gas conveyance channel 131 at a position between the inflator 125 and the slotted deployment opening 136.

In the arrangement illustrated in FIGS. 5–7, the modular housing 126 may incorporate a pivot element 134 which is adapted to undergo hinging displacement upon application of pressure in the region of the air bag cushion mouth portion 135. As shown, a segmented spring biasing element 139 including a multiplicity of resilient finger elements 140 may be disposed along the travel path of the air bag cushion to provide a drag force during deployment.

As best illustrated through simultaneous reverence FIGS. 5 and 7, upon emission of inflation gas from the gas emitting inflator 125, a pressure is developed within the mouth portion 135 of the air bag cushion 130 thereby causing displacement of the pivot element 134 so as to develop the slotted deployment opening 136 within the dash panel 115. The pressurized portion of the air bag cushion 130 which is adjacent to the slotted deployment opening 136 is pushed through the slotted deployment opening 136 along the length of the slotted deployment opening 136. The air bag cushion 130 thus emerges as a bubble extending substantially along the length of the slotted deployment opening 136. As additional inflation gas is introduced through the mouth portion 135 the previously folded main body portion is gradually pulled away from its initial storage position 138 and out the slotted deployment opening 136 subject to the drag force applied by the spring biasing element 139.

The utilization of a spring biasing element 139 along the width of the air bag system may be beneficial in promoting smooth deployment of the air bag cushion by the introduction of a drag force which both slows the withdrawal of the cushion from the storage position 138 and aids in preventing bunching and entanglement of the air bag cushion 130. Of course, the spring biasing element may also be eliminated if desired.

Still another arrangement for an air bag system adapted to deploy an inflated cushion through a narrow slot opening is illustrated in FIG. 8 wherein elements corresponding to those previously described are designated by like reference numerals within a 200 series. As illustrated in FIG. 8, the air bag system 216 includes a gas emitting inflator 225 and an air bag cushion 230 having a main body portion held within a storage chamber 238 as a roll disposed around a roller element 242. As will be appreciated, the arrangement illustrated in FIG. 8 operates in substantially the same manner as that illustrated and described in relation to FIGS. 5–7 with the exception that the body portion of the air cushion 230 is normally stored as a roll rather than as a folded arrangement. Thus, upon activation of the gas emitting inflator 225, the air bag cushion 230 is gradually pulled away from the roller element 242 until deployment is complete. As will be appreciated, in such an arrangement the roller element 242 is preferably biased against rotation such as by a spring or the like so as to impart a drag inducing tensioning force through the air bag cushion 230 as it is unwound. However, it is likewise contemplated that the roll element 242 may be freely rotatable if desired.

Still another arrangement for an air bag system 316 is illustrated in FIGS. 9 and 10 wherein elements corresponding to those previously described are designated by like reference numerals within a 300 series. As illustrated, in this arrangement the inflator 325 is supported beneath the dash panel 315 at a position behind a seam 332 of elongate construction. The air bag cushion 330 is held within a storage chamber 328 such that the body of the air bag cushion is in folded relation in front of the inflator 325 relative to the direction of forward vehicle travel. A portion of the air bag cushion extends beneath the inflator and terminates at a mouth portion 335 attached around an inflator gas outlet 331.

As best seen in FIG. 10, upon activation of the inflator 325 inflation gas enters the air bag cushion 330 and develops a pressure in the vicinity of the mouth portion 335. The development of this pressure causes the seam 332 to open thereby forming a slotted cushion deployment opening 336 (FIG. 10) through which the inflated portion of the air bag cushion 330 emerges in a bubble-like manner. If desired, the opening of the seam 332 may be facilitated by a multi-finger or solid wall resilient pivot element 334 which engages an interior portion of the dash panel structure. The pivot element 334 is deflected by the pressurized air bag cushion 330 thereby translating force to the seam 332.

As will be appreciated, in operation the air bag cushion 330 is progressively pulled out of the storage chamber 328 and forced through the cushion deployment opening 336. The elongate relatively narrow construction of the cushion deployment opening 336 provides a drag force over substantially the entire deployment cycle. Thus, an enhanced degree of control is maintained over the deployment character so as to preclude a rapid and uncontrolled punch out of the cushion towards the occupant to be protected.

Still another arrangement for an air bag system 416 is illustrated in FIGS. 11 and 12 wherein elements corresponding to those previously described are designated by like reference numerals within a 400 series. As illustrated, in this arrangement the inflator 425 is supported beneath the dash panel 415 at a position behind a seam 432 of elongate construction. The air bag cushion 430 is held within a storage chamber 428 such that the body of the air bag cushion 430 is in folded relation in front of the inflator 425. A portion of the air bag cushion 430 extends beneath the inflator 425 and terminates at a mouth portion 435 attached around an inflator gas outlet 431.

As best seen in FIG. 12, upon activation of the inflator 425 inflation gas enters the air bag cushion 430 and develops a pressure in the vicinity of the mouth portion 435. The development of this pressure in turn causes the seam 432 to open thereby forming a slotted cushion deployment opening 436 through which the inflated portion of the air bag cushion emerges in a bubble-like manner. If desired, the opening of the seam 432 may be facilitated by a multi-finger or solid wall resilient pivot element 434 which engages an interior portion of the dash panel structure. The pivot element 434 is deflected by the pressurized air bag cushion 330 thereby translating force to the seam 432.

The air bag system 416 illustrated in FIGS. 11 and 12 includes a drag inducing biasing element 439 such as a leaf spring or the like disposed along the travel path of the air bag cushion 430 between the storage chamber 428 and the deployment opening 436. While the drag inducing biasing element 439 is illustrated as a leaf spring, it is to be understood that virtually any suitable structure may be used. By way of example only, and not limitation, such structures may include expansible or fixed width slots, rollers, and the like as well as combinations of such elements.

As will be appreciated, in operation the air bag cushion 430 is progressively pulled out of the storage chamber 428 and past the drag inducing biasing element 439. After passing the biasing element 439 the air bag cushion is forced through the cushion deployment opening 436. In this arrangement the combination of the biasing element and the elongate relatively narrow construction of the cushion deployment opening 436 provide a drag force over substantially the entire deployment cycle. Thus, an enhanced degree of control is maintained over the deployment character so as to preclude a rapid and uncontrolled punch out of the cushion towards the occupant to be protected.

It is also contemplated that the utilization of a prolonged drag force during the deployment cycle may be useful in so called "top mount" air bag systems in which the air bag cushion is deployed through the top of the dash panel. One exemplary top mount system 516 is illustrated in FIGS. 13 and 14 wherein components corresponding to those previously described are designated by like reference numerals within a 500 series. As illustrated, in this arrangement the inflator 525 is supported beneath the dash panel 515 at a position below a seam 532 extending along a portion of the dash panel 515. The air bag cushion 530 is held within a storage chamber 528 such that the body of the air bag cushion 530 is in folded relation below the inflator 525. A portion of the air bag cushion 530 extends partially around the inflator 525 and terminates at a mouth portion 535 attached around an inflator gas outlet 531.

As best seen in FIG. 14, upon activation of the inflator 525 inflation gas enters the air bag cushion 530 and develops a pressure in the vicinity of the mouth portion 535. The development of this pressure in turn causes the seam 532 to open thereby forming a relatively narrow cushion deployment opening 536 across the top of the dash panel 515 through which the inflated portion of the air bag cushion emerges in a bubble-like manner. If desired, a pivot element 534 such as a plate structure or the like may be disposed beneath the dash panel 515 to aid in the controlled expansion of the deployment opening 536. As illustrated, in such a construction the pivot element 534 is deflected by the pressurized air bag cushion 530 thereby translating force to the seam 532. If desired, such a pivot element may be configured with a relatively small angle of rotation thereby limiting the final open width of the cushion deployment opening 536.

The air bag system 516 illustrated in FIGS. 13 and 14 includes a drag inducing biasing element 539 such as a leaf spring or the like disposed along the travel path of the air bag cushion 530 between the storage chamber 528 and the deployment opening 536. While the drag inducing biasing element 539 is illustrated as a leaf spring, it is to be understood that virtually any suitable structure may be used. By way of example only, and not limitation, such structures may include expansible or fixed width slots, rollers, and the like as well as combinations of such elements.

As will be appreciated, in operation the air bag cushion 530 is progressively pulled out of the storage chamber 528 and past the drag inducing biasing element 539. After passing the biasing element 539 the air bag cushion is forced through the cushion deployment opening 536. In this arrangement the combination of the biasing element 539 and the relatively narrow construction of the cushion deployment opening 536 provide a drag force over substantially the entire deployment cycle. Thus, an enhanced degree of control is maintained over the deployment character so as to preclude a rapid and uncontrolled punch out of the cushion.

Regardless of the arrangement utilized, the controlled expulsion the air bag cushion through a relatively narrow slotted deployment opening is believed to provide several benefits. In particular, due to the restricted deployment of the air bag cushion against controlled drag forces caused by the slot geometry and any additional drag inducing elements, an uncontrolled expulsion of the air bag cushion is avoided thereby permitting a substantially uniform and prolonged deployment over a defined area. Thus, a rapid and localized punch out of the air bag cushion is avoided while the available period of energy transfer between the cushion and the occupant to be protected is prolonged. Moreover, the arrangements in accordance with the present invention are believed to provide the further benefit of directing the air bag cushion generally towards the torso and thorax of the occupant to be protected rather than towards the head and neck.

In addition to operational benefits during normal operation, it is also contemplated that the controlled deployment of an air bag cushion subject to restrictive drag forces through a relatively narrow opening may afford substantial benefits in the event that an occupant is seated in unusually close relation to the deployment opening. In particular, it is contemplated that in the event that an occupant is located too close to the deployment opening, the air bag cushion will nonetheless be able to deploy through the portions of the elongated slot opening which are not obstructed by the occupant thereby permitting the cushion to deploy around the occupant and still provide protection without applying an unreasonable level of localized force to the out of position occupant.

It is also contemplated that the principles of the present invention have equal applicability to air bag systems for protection for a vehicle operator. By way of example only, in FIGS. 15–17 there is illustrated a driver side air bag system 617 which may be adapted for use at a confined location within the vehicle including at the interior of a steering wheel. As shown, the air bag system 617 includes a gas emitting inflator 625 held at a base plate 645. An air bag cushion 630 is secured around the inflator 625 by a retainer ring 647 such that the air bag cushion 630 is held in substantially overlying and surrounding relation to the inflator 625. As shown, in the arrangement of FIGS. 15–17 a pair of friction bars 648 are disposed outboard of the retainer ring 647 such that the material forming the air bag cushion 630 is held between the base plate 645 and the friction bars 648.

As best illustrated through simultaneous reference to FIGS. 16 and 17, the friction bars 648 are spaced away from the base plate 645 so as to permit an upper layer of the material forming the air bag cushion 630 to slide beneath the friction bars 648 as expansion proceeds. Thus, as inflation gas is emitted from the inflator 625, the folded portion of the air bag cushion 630 disposed outboard the friction bars 648 is pulled beneath the friction bars by tension forces within the inflated portion of the air bag cushion. A drag force is thereby applied to the air bag cushion 630. A rapid localized punch out of the air bag cushion 630 is thereby prevented and the period of energy transfer between the air bag cushion 630 and the occupant to be protected is prolonged.

It is also contemplated that other arrangements may be utilized to apply a controlled drag force to the expanding air bag cushion. By way of example only, in FIGS. 18 and 19 an air bag system 717 is illustrated incorporating roller-type drag elements wherein components corresponding to those previously described are designated by like reference numerals within a 700 series. As shown, the air bag system 717 is substantially similar to that illustrated in FIG. 15 with the exception that the air bag cushion 730 (shown in phantom) is held in roll form around tension inducing rollers 750 mounted above the base plate 745 in outboard relation to the inflator 725. By way of example only, one embodiment of a tension inducing roller 750 as may be utilized is illustrated in FIG. 19. As shown, in this exemplary embodiment the tension inducing roller 750 includes a central roller portion 752 surrounding a hub 754 which projects away from the ends of the roller portion 752. As illustrated, the hub 754 is surrounded by an arrangement of outwardly projecting ridge members 755 which are adapted to engage a torsion spring 756. The tension inducing rollers 750 are capped at either end by friction washers 758. Thus, as the material defining the air bag cushion 730 is withdrawn from the tension inducing rollers 750, the torsion spring 756 is placed into compression as it is twisted by the ridge members 755. This torque thereby applies a drag force to the air bag cushion 730 as the spring 756 attempts to recover its initial condition.

The operation of an air bag assembly incorporating drag-inducing rollers is illustrated through simultaneous reference to FIGS. 20 and 21. As shown in FIG. 20, prior to emission of inflation gas from the inflator 725, the air bag cushion 730 is secured in a substantially uninflated state surrounding the inflator 725 with loose edges of the air bag 730 being held in roll form around the rollers 750. However, upon the expulsion of inflation gas by the inflator 725, the air bag cushion 730 undergoes pressurization thereby establishing a tension through the air bag cushion and pulling the previously unused material away from the rollers 750 as the air bag cushion achieves an inflated state (FIG. 21). Of course, during the inflation the mouth of the air bag remains secured around the inflator such that a pressurized system is maintained.

It is also contemplated that the practices of the present invention are also applicable to air bag systems of the type which may utilize a substantially torroidal cushion for disposition around a decorative emblem at the center of a steering wheel. By way of example only, an air bag system 817 incorporating an inflatable air bag cushion 830 of torroidal construction is illustrated in FIGS. 22 and 23. As shown, the air bag assembly 817 is adapted to permit the deployment of a substantially torroidal air bag cushion 830 around an emblem 870. In this respect, a first edge of the air bag cushion 830 is affixed around the inflator 825 by a retainer ring 847 or the like to define a mouth opening for the cushion 830. A distal edge of the air bag cushion is likewise affixed at an attachment location 872 above the inflator and below the emblem. The cushion material between the attached edges is packaged in folded relation within the housing around the inflator as shown with a portion of the packaged air bag cushion 830 disposed outboard of a restraining ring 874.

As inflation proceeds (FIG. 23) the folded portion of the air bag cushion 830 outboard of the restraining ring 874 is pulled around the restraining ring 874 for deployment out of the housing. Thus, the restraining ring 874 places a drag on the outward deployment of the air bag cushion 830. If desired, a spring flange 876 may be disposed in adjacent relation to the restraining ring 874 such that the cushion material pulled around the restraining ring 874 passes between the restraining ring 874 and the spring flange 876. Such an arrangement may increase drag resistance and facilitate avoidance of entanglement and bunching of the cushion material as it is pulled around the restraining ring 874.

In FIGS. 24 and 25 there is illustrated another arrangement for drag-inducing deployment of a torroidal air bag cushion wherein elements corresponding to those in FIGS. 22 and 23 are designated by like reference numerals within a 900 series. As will be appreciated, this arrangement operates in substantially the same manner as that described relation to FIGS. 22 and 23, with the exception that the restraining ring 974 incorporates an internal spring thereby avoiding the use of the spring flange. As shown, in this embodiment the restraining ring 974 is of a substantially open "C" compressible cross sectional configuration having internal spring characteristics. The restraining ring 974 is supported in adjacent relation to an overhanging flange member 978 such that during withdrawal of the material forming the air bag cushion 930, the material passes between the flange member 978 and the restraining ring 974. Thus, the restraining ring is compressed as the material passes between the restraining ring 974 and the flange member 978 and a biasing force is applied against the air bag cushion material. Thus, as illustrated in FIG. 25 the restraining ring 974 imparts a tensioning drag force to the air bag cushion material as it is withdrawn from the housing during inflation.

As with previously described configurations, the drag force applied to the air bag cushion material during deployment of the torroidal air bag cushions 830, 930 prevents localized punch out of the cushion and extends the period of energy transfer between the cushion and the occupant to be protected. As previously indicated, such prolonged interaction may be desirable in avoiding the undue application of force to the occupant.

It is to be understood that while the present invention has been illustrated and described in relation to various exemplary embodiments, constructions and practices that such embodiments, constructions and practices are intended to be illustrative only and that the present invention is in no event to be limited thereto. Rather, it is contemplated that modifications and variations embodying the principles of the present invention will no doubt occur to those of skill in the art and it is therefore contemplated and intended that the present invention shall extend to all such modifications and variations as may incorporate the broad principles of the invention within the full spirit and scope thereof.

What is claimed is:

1. An air bag assembly for cushioning restraint of an occupant in a vehicle during an impact event, the air bag assembly comprising:

an inflatable air bag cushion adapted to be inflated from a storage chamber beneath a dash panel of the vehicle through an elongate slotted deployment opening extending in the cross-vehicle direction, wherein the slotted deployment opening extends a length greater than the width of the occupant;

a gas emitting inflator disposed in fluid communication with the air bag cushion adapted to distribute gas into a mouth portion of the air bag cushion; and at least one drag-inducing member comprising said elongate slotted deployment opening adapted to engage the air bag cushion as the air bag cushion is inflated from the stored condition to the inflated deployed condition such that deployment of the air bag cushion is retarded such that the period of energy transfer between the air bag cushion and the occupant is increased relative to unrestrained deployment from the storage chamber wherein the air bag system is adapted to deploy the air bag cushion through a portion of the dash panel facing the occupant to be protected and wherein a first portion of the air bag cushion is normally stored in folded relation forward of the inflator relative to the normal travel direction of the vehicle and wherein a second portion of the air bag cushion extends along a path below the inflator for attachment at a position between the inflator and said elongate slotted deployment opening such that upon inflation the first portion of the air bag cushion is progressively pulled along the path below the inflator and discharged through said elongate slotted deployment opening.

2. The invention as recited in claim 1, further comprising a drag inducing element disposed along a cushion travel path between the storage chamber and slotted deployment opening.

3. The invention as recited in claim 2, wherein the drag inducing element disposed along a cushion travel path between the storage chamber and slotted deployment opening comprises a floating pinch point.

* * * * *